United States Patent

[11] 3,617,786

| [72] | Inventor | Henry J. Stielper<br>Baltimore, Md. |
| --- | --- | --- |
| [21] | Appl. No. | 36,860 |
| [22] | Filed | May 13, 1970 |
| [45] | Patented | Nov. 2, 1971 |
| [73] | Assignee | The Black and Decker Manufacturing Company<br>Towson, Md. |

[54] ELECTRIC MOTOR COMMUTATOR END CONSTRUCTION
7 Claims, 5 Drawing Figs.

[52] U.S. Cl. ........................................... 310/242,
 310/43, 310/89, 310/247
[51] Int. Cl. ........................................ H01r 39/38
[50] Field of Search........................................... 310/89,
 239, 240, 238, 242, 247, 43, 50, 71; 56/25.4

[56] References Cited
UNITED STATES PATENTS

| 2,798,979 | 7/1957 | Ernst ............................ | 310/239 X |
| --- | --- | --- | --- |
| 3,182,218 | 5/1965 | Videtil ........................... | 310/239 |
| 3,500,620 | 3/1970 | Duran et al. .................. | 56/25.4 |
| 2,663,810 | 12/1953 | Stein ............................. | 310/238 |

Primary Examiner—Duggan D. F.
Assistant Examiner—B. A. Reynolds
Attorneys—Bloom, Leonard, Joseph R. Slotnik and Edward D. Murphy ABSTRACT: A rotary electric lawn mower having a double insulated permanent magnet motor. An insulating end cap is fitted to the field retaining ring and holds the armature bearing. Brush rigging for the commutator is trapped under a cap affixed to the end member. Ribs are provided in an outer housing to keep the cap in position if the normal retaining means becomes loose.

INVENTOR
HENRY J. STIELPER

BY Edward D. Murphy

ATTORNEY

INVENTOR
HENRY J. STIELPER
BY Edward D. Murphy
ATTORNEY

ELECTRIC MOTOR COMMUTATOR END CONSTRUCTION

The present invention pertains to an improved electric motor construction, particularly for use in an electric lawn mower, and specifically pertains to an improved end cap and brush rigging construction for such motors.

In the construction of electric motors, particularly for consumer-type appliances, such as electric lawn mowers, it is of importance that the assembly be as safe and rugged as possible so that it can withstand the rigors of both normal and careless use; at the same time, the construction must be economical to manufacture. The purpose of this invention is to provide such a construction for the commutator end of an electric motor.

Accordingly, it is an object of this invention to provide an improved electric motor construction.

A further object of this invention is the provision of a novel electric motor construction which is of improved safety.

A further object of this invention is the provision of an inexpensive electric motor construction which can withstand hard usage and minimize the danger of electric shock.

Further objects and advantages of this invention will become apparent as the description and illustration thereof proceed.

In the drawings, FIG. 1 is a perspective view of a representative lawn mower which may include the construction of the present invention;

Briefly, in accord with one embodiment of this invention, an electric motor is provided which includes an insulating end member which retains the commutator end bearing of the armature and which is coupled to the field of the motor. A radially extending slot is provided in the end member for receiving a brush holder and brush for electrical connection to the commutator of the armature. A lead connected to the brush extends to a connector by means of which it is connected appropriately in the energizing circuit. An aperture is provided in the insulating end member for receiving the connector or a portion thereof. In further accord with this invention, a cap is retained in place over the slot and the aperture so as to retain the brush holder and connector in fixed position. In further accord with the present invention, a rib is provided on the outer housing which encloses the motor, the rib being positioned so as to entrap the cap against the insulating member to prevent the movement thereof if the normal retaining means should become loose during use.

Figure 1:
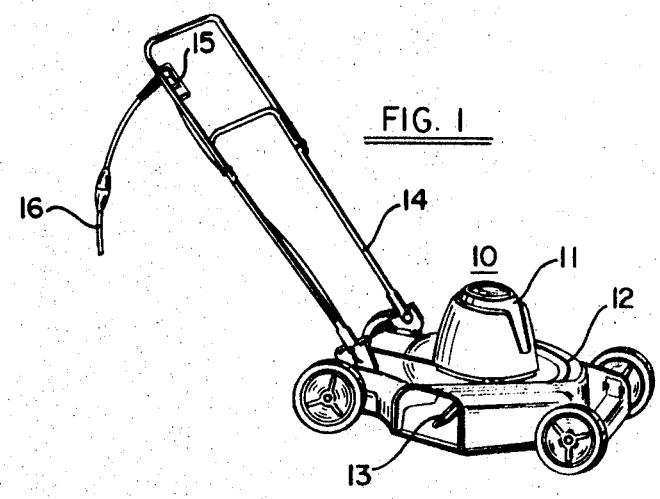

In FIG. 1, a representative lawn mower 10 is illustrated which comprises a motor housing 11 which encloses an electric motor. The housing 11 is mounted on a deck portion 12 within which a blade 13 is mounted at the end of the motor shaft for rotation therewith. A handle 14 is provided for engagement by the operator and a switch 15 is mounted on the handle. The mower is connected to a source of alternating current via an extension cord 16 and the motor is energized when the switch 15 is operated.

Figure 2:
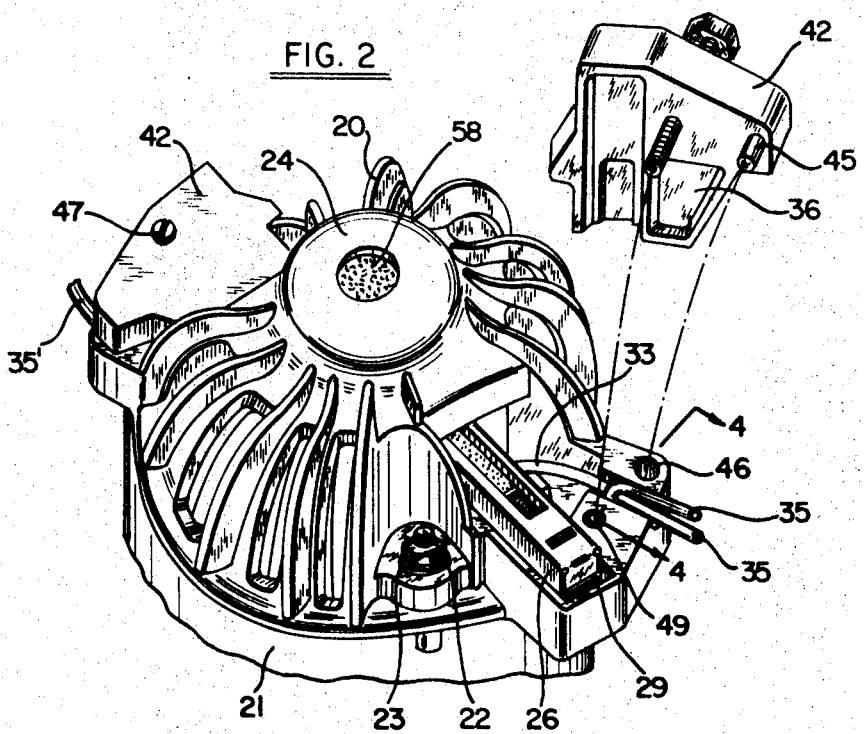
FIG. 2 is a perspective view, partially exploded, of the commutator end construction of a motor in accord with the present invention.

FIG. 2 illustrates the commutator end construction of the motor enclosed within the housing 11. As shown therein, the end construction comprises an insulating end member 20 which is mounted to the field 21 of the electric motor by means of a plurality of bolts 22 and nuts 23. The field 21 may be any appropriate construction such as a wound field or, in a preferred embodiment, a pair of semicylindrical permanent magnets retained on a steel cylinder. An armature is arranged to rotate within the field upon appropriate energization; the end member 20 includes a bearing-support region 24 which carries the end of the armature shaft.

The end member 20 is made of any suitable insulating material which is of sufficient strength and heat-resistant characteristics to provide permanent, stable retention of the various parts. For example, glass-filled polyester or other suitable plastics, preferably of the thermosetting type, may be used.

Figure 3:
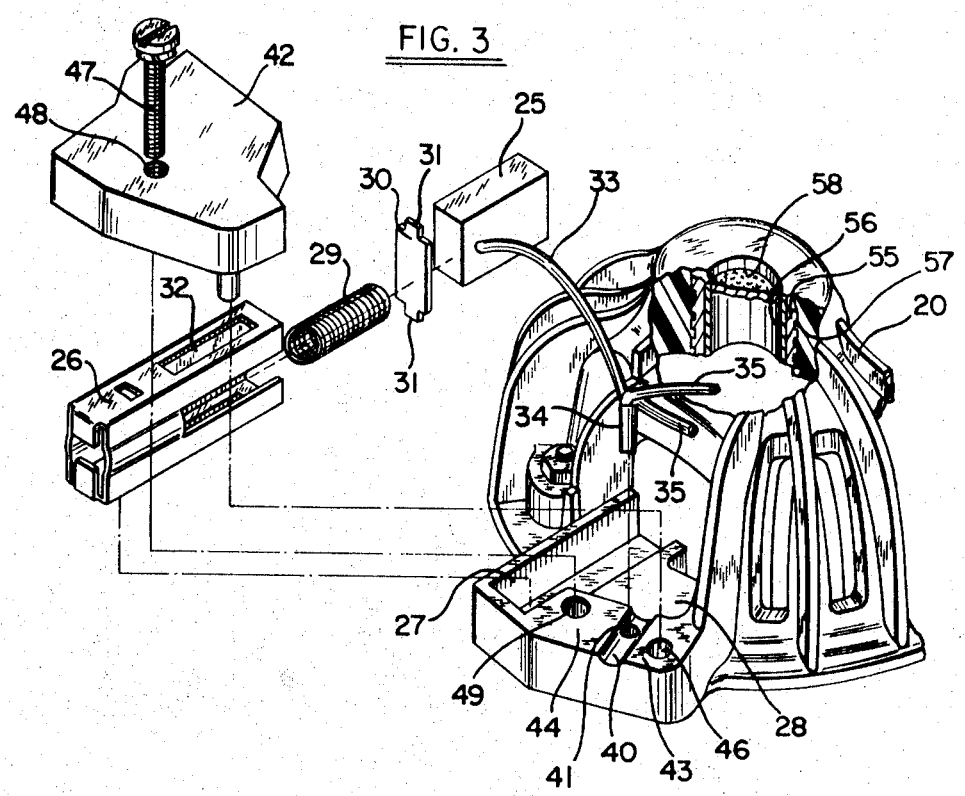
FIG. 3 is a more detailed view of the construction of FIG. 2.

The brush ring construction in accord with this invention is shown in FIG. 2 and, in more detail, in FIG. 3. As illustrated, the brushes 25 are retained within a brush guide 26 which is accommodated within a slot 27 in an axially facing surface 28 of the end member 20. A brush spring 29 is provided within the brush guide and a spring retainer 30 includes tabs 31 which engage slots 32 in the brush guide to retain the spring therein. Thus, the spring forces the brush in a radially inward direction to engage the commutator bars of a rotating armature, in the usual manner.

Electrical connection to the brush 25 is made via a shunt lead 33 which terminates in a connector 34 where it is mechanically and electrically coupled to wires 35 which connect the brush to the remainder of the circuit.

Figure 4:
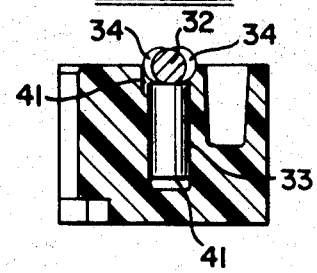
FIG. 4 is a cross-sectional view of a portion of FIG. 2.

In the normal course of using the motor, the brushes are worn due to rotation of the commutator and the spring 29 forces the brush inwardly to compensate for the wear. After some time, the brush may wear so thin that it can slip out of the brush guide. While the spring retainer 30 prevents the spring from driving the brush out to produce a dangerous condition, the brush and lead 32 may, in many previous constructions, be loose within the motor and constitute a hazard due to the possibility that these may contact metal which may be touched by the operator. In accord with the present invention, a portion of the axially facing surface 28 includes a shallow channel 40 having an opening 41 therein which is adapted to receive the connector 34. In the assembled condition, the connector 34 fits into the opening 41 and the leads 33 and 35 extend in the channel 40, as illustrated in FIG. 2. Finally, a cap 42 is provided which tightly overlies the adjacent regions 43 and 44 of the axially facing surface 28 and accordingly entraps the leads 33 and 35 in the channel 40. Conveniently, the cap 42 may be located by means of a pin-shaped extension 45 which fits into an aperture 46 and held in place by a bolt 47 which extends through aperture 48 in the cap, aperture 49 in the end member 20, and is engaged by a nut 50 shown in FIG. 5. A cross-sectional view of the region of the end member including the aperture 41 is shown in FIG. 4. As can be seen therein, the connector 34 is relatively tightly fitted within the aperture 41 and the leads 33, 35 are arranged to be compressed within the channel 41 when the cap 42 is placed thereon. Of course, the second brush assembly required for completing the connection through the armature is similar and is covered by the cap 42' shown in the assembled position in FIG. 2.

It will be seen from the foregoing that the described construction, while inexpensive and easily assembled since it uses a minimum number of parts, also provides a safe and rugged construction which is arranged to minimize the possibility of injury in the event that the brushes wear sufficiently so as to come out of the brush guides. A particular advantage of this invention is the fact that the brush lead 33 may be somewhat longer than necessary so that no strain is produced therein as the brush wears. Excess lead length is contained within recess 36 in the cap 42. It is also noted that, in the illustrated construction, the electrically live brushes are substantially enclosed so that, if a careless operator removes the outer housing 11 while the motor is plugged in and turned-on, it is still difficult for him to reach live metal.

Figure 5:
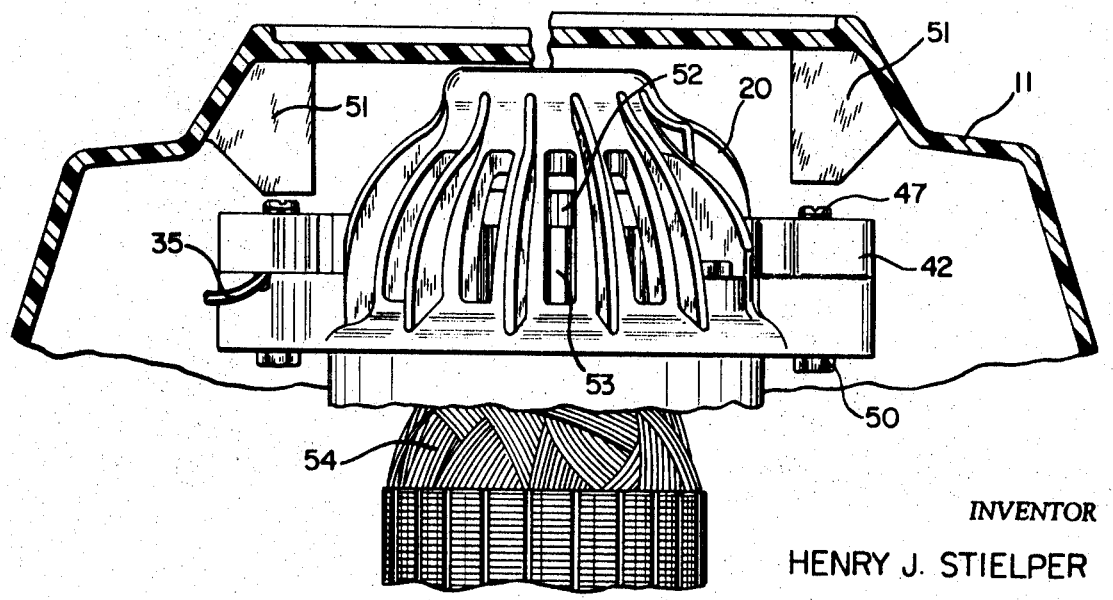
FIG. 5 is a cross-sectional view of a portion of FIG. 1.

In further accord with the invention, it has been recognized that the bolt and nut combination 47-50 which hold the cap 42 in place might loosen during use and allow the connector 34 to come out of the opening 41. To prevent this possibility, the outer housing 11, as illustrated in FIG. 5, includes a pair of ribs 51 which depend from the upper surface thereof. The right-hand side of the figure illustrates the housing 11 in a position slightly above its fully seated position. The left-hand side of FIG. 5 show the housing in the fully seated position wherein the rib 51 is disposed immediately above the head of the bolt 47. Thus, after the motor assembly has been completed and the housing 11 is placed in its seated position, the bolt is retained against any possibility of falling out of the apertures 48, 49. Accordingly, the cap is firmly held in place as are the connector and leads.

FIG. 5 also illustrates, in dotted outline, the armature used in the motor of this invention. The shaft 52 extends into the bearing-support region 24 and carries a commutator 53 which is contacted by the brushes. The commutator, in turn, is connected to coils 54 on the armature in the usual manner.

As an additional feature of this invention, the end cap 20 also provides a bearing surface for the end of the armature shaft. As shown in FIG. 3, the bearing supporting region 24 includes a bearing retainer 55 and a bushing 56 which constitutes the stationary bearing surface. Conveniently, the retainer member 55 is positioned in a mold and the end member 20 is molded around it and into rings 57 which hold it axially. Thereafter, a fiber oil wick 58 is placed in the retainer and the bushing 56 is pressed in place within the retainer. At an appropriate time during assembly, the armature shaft 52 is fitted into the bushing. This construction is advantageous in that the inner retainer member 55 can be of steel, thus providing good heat transfer which assists in curing the plastic during the molding process and, in the finished article, the steel retainer provides a substantial heat sink to assist in the removal of heat from the bearing and the dissipation thereof into the surrounding plastic. The bushing 56 is of conventional material such as bronze.

While the invention has been set forth herein with respect to a specific embodiment, many modifications and changes will readily occur to those skilled in the art. Accordingly, it is intended that the appended claims cover all such modifications and changes as may fall within the true spirit and scope of the present invention.

I claim:

1. In an electric motor including an armature having a commutator, and brushes for making electrical connection thereto, the combination of
    an insulating end member for said motor;
    brush holder means located in an axially facing surface of said end member;
    a brush located in said brush holder means;
    a cap covering said axially facing surface and retaining said brush between said cap and said surface;
    a flexible lead wire electrically connected to said brush at one end of said wire;
    a connector coupling the other end of said lead wire in an electrical circuit;
    an aperture in said end member for receiving said connector;
    a portion of said cap being arranged to retain said connector in said aperture; and
    means mounting said cap to said end member.

2. The combination claimed in claim 1 wherein said brush holder means comprises a radially extending slot formed in said axially facing surface of said end member; and a metallic brush holder positioned in said slot for retaining said brush.

3. The combination claimed in claim 1 wherein said axially facing surface and said cap define therebetween a channel for receiving the portions of said leads adjacent said connector.

4. The combination claimed in claim 1 wherein said mounting means for said cap comprises a bolt extending through said cap and said end member.

5. In an electric power tool including a housing, an electric motor mounted in said housing, and an element extending from said housing for providing an output, said electric motor including an armature having a commutator, and brushes for making electrical connection thereto; the improvement comprising an insulating end member for said motor; brush holder means located in an axially facing surface or said end member; a brush located in said brush holder means; a cap covering said axially facing surface and retaining said brush between said cap and said surface; a lead electrically connected to said brush and terminating in a connection to an electrical circuit; an aperture in said end member for receiving the terminal portion of said lead; a portion of said cap being arranged to retain said terminal portion in said aperture; and means mounting said cap to said end member; said housing comprising an end portion generally enclosing said end member; and a rib portion extending toward said end member from said end portion, said rib terminating adjacent said cap when said housing is in an assembled position whereby movement of said cap sufficient to release said terminal portion of said lead from said aperture is prevented by said rib.

6. The combination claimed in claim 5 wherein said cap is retained on said end member by a bolt extending therethrough; said rib being positioned adjacent said bolt so as to retain said bolt in operative position and thereby retain said cap on said end member.

7. In a lawn mower comprising blade means for cutting grass, deck means for enclosing said blade, means mounting said deck for movement over the ground and an electric motor including an armature having a commutator and brushes for making electrical connection thereto, the combination of
    an insulating end member for said motor;
    brush holder means located in an axially facing surface of said end member;
    a brush located in said brush holder means;
    a cap covering said axially facing surface and retaining said brush between said cap and said surface;
    a lead electrically connected to said brush and terminating in a connection to an electrical circuit;
    an aperture in said end member for receiving the terminal portion of said lead;
    a portion of said cap being arranged to retain said terminal portion in said aperture; and
    means mounting said cap to said end member;
    a housing enclosing said motor and having an end portion enclosing said end member;
    said housing including rib portions extending toward said cap for retaining said cap in engagement with said end member.

* * * * *